June 1, 1937. R. M. PHINNEY 2,082,742
CENTRALIZED TRAFFIC CONTROLLING SYSTEM FOR RAILROADS
Filed Dec. 27, 1934 7 Sheets-Sheet 1
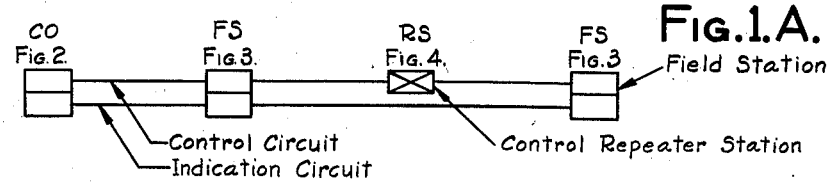
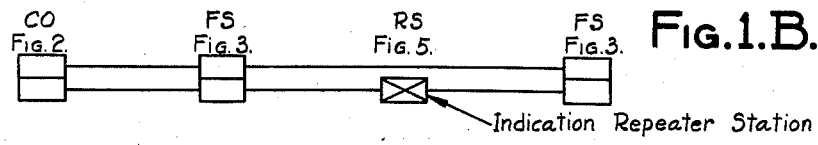
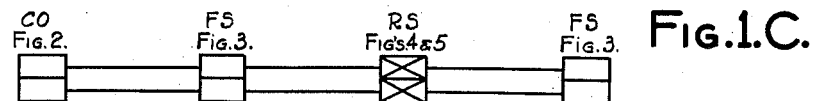
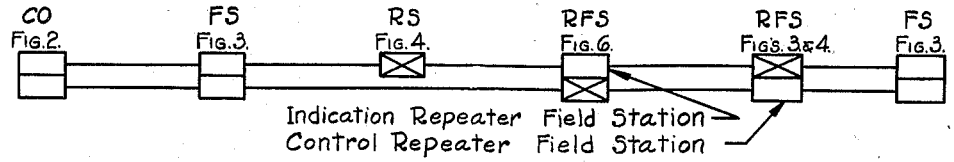
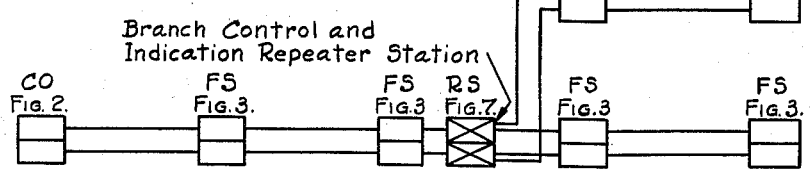
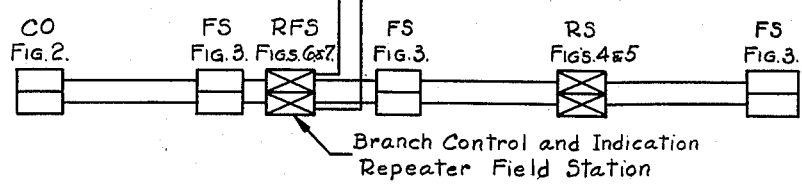
INVENTOR
R. M. Phinney,
BY Neil D. Preston,
his ATTORNEY

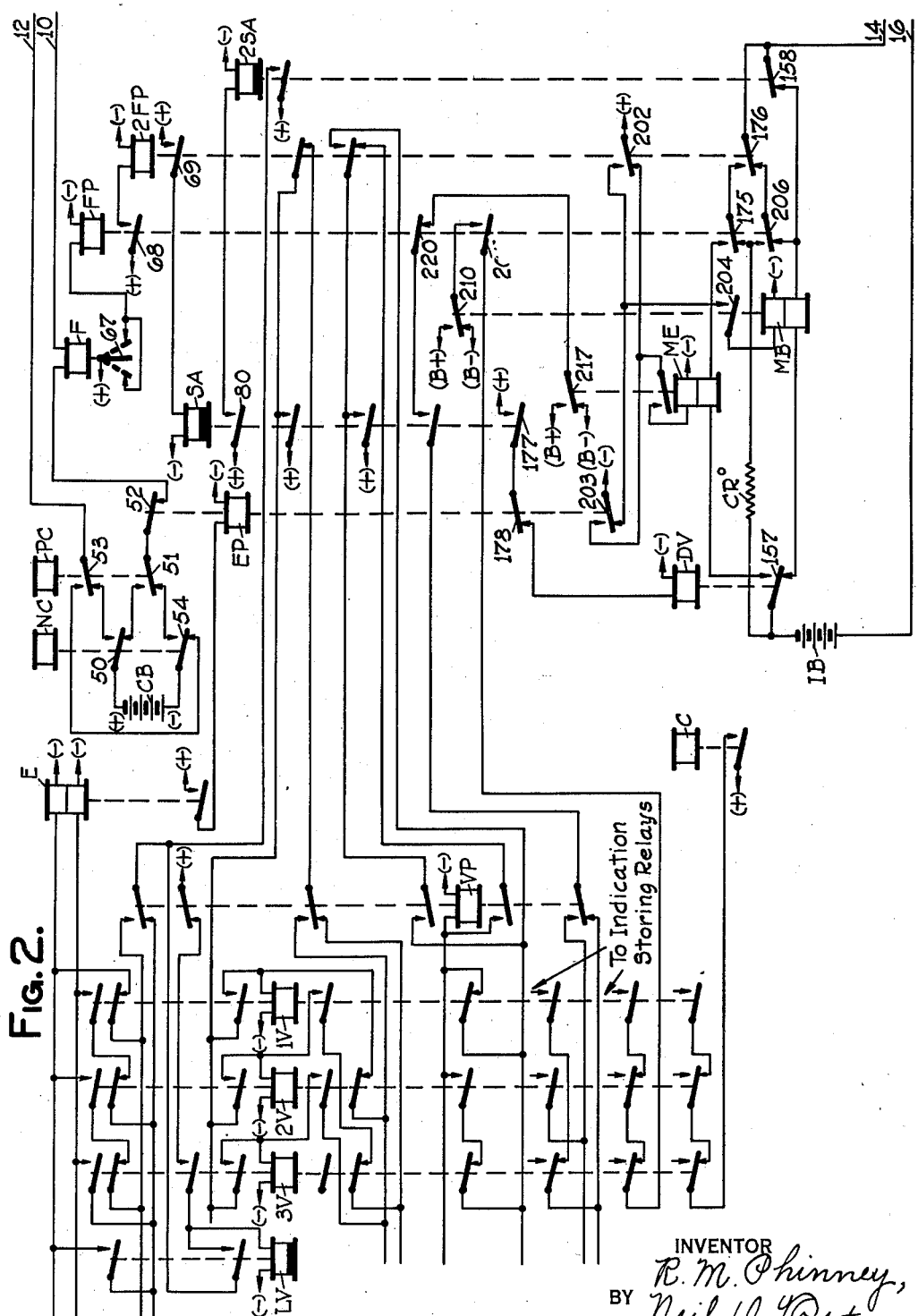

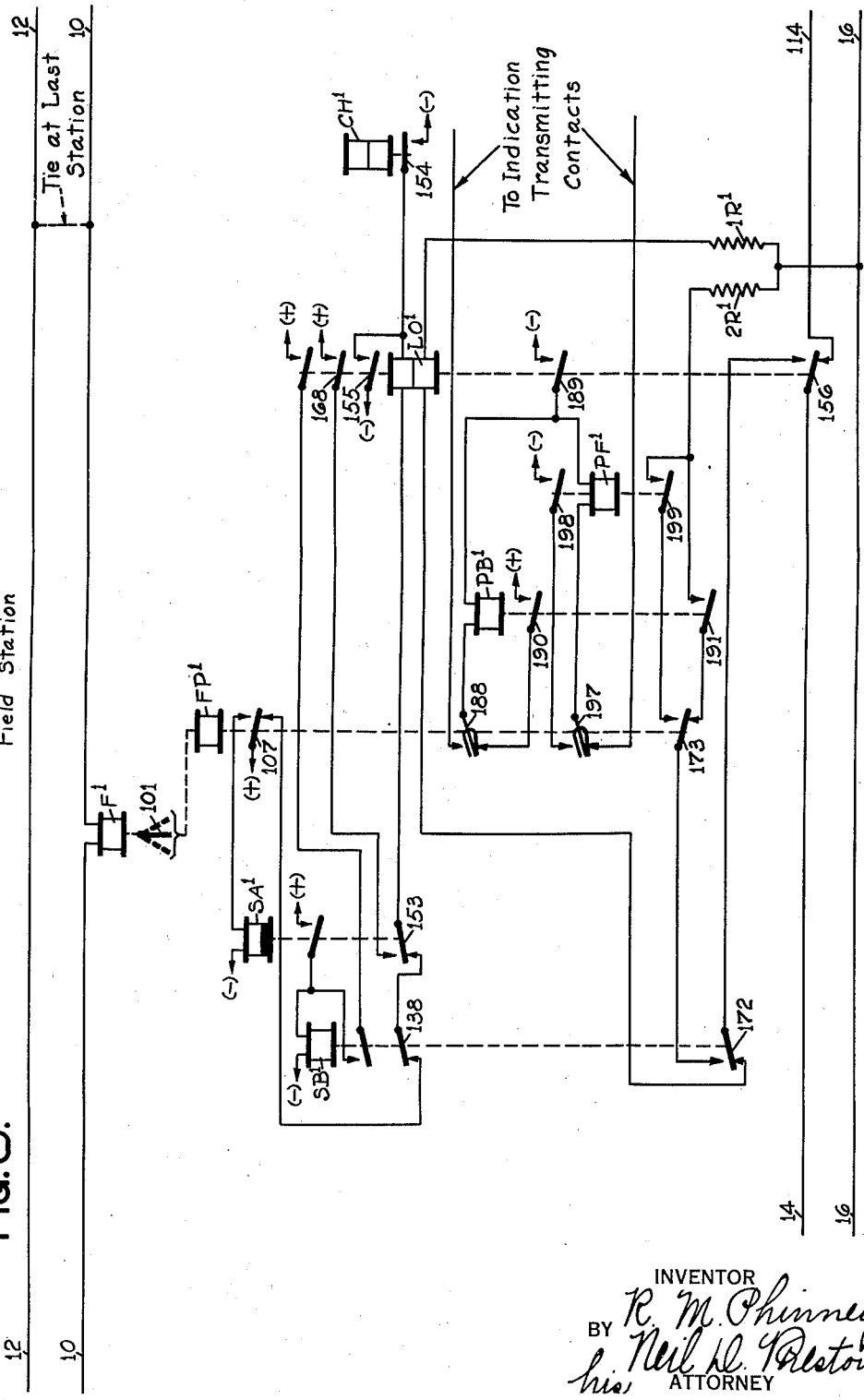

June 1, 1937. R. M. PHINNEY 2,082,742
CENTRALIZED TRAFFIC CONTROLLING SYSTEM FOR RAILROADS
Filed Dec. 27, 1934 7 Sheets-Sheet 4
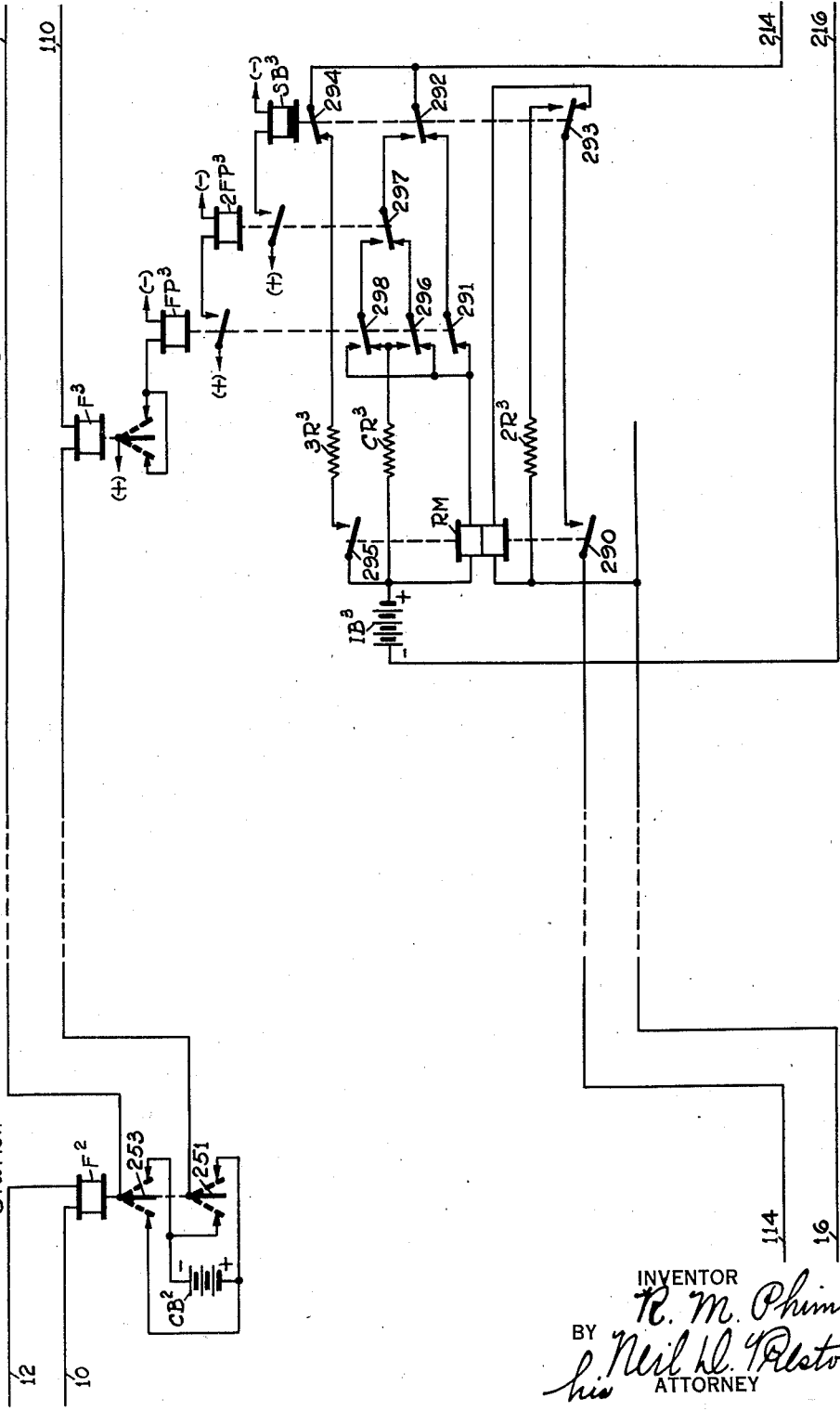
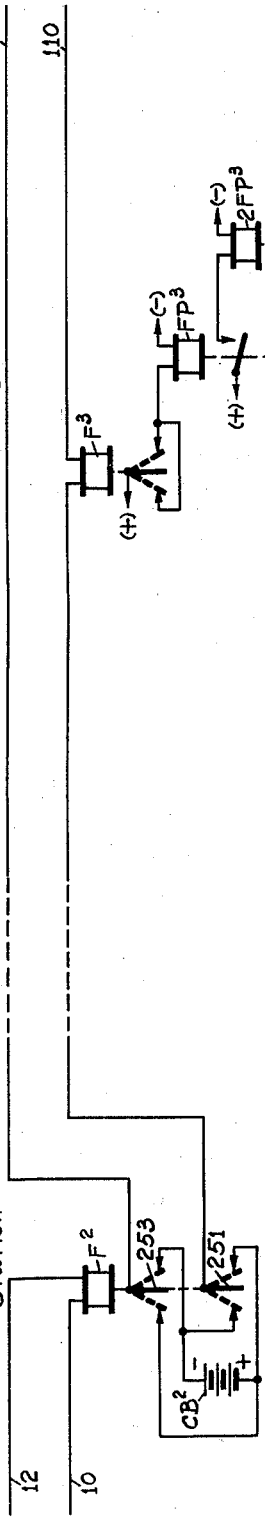

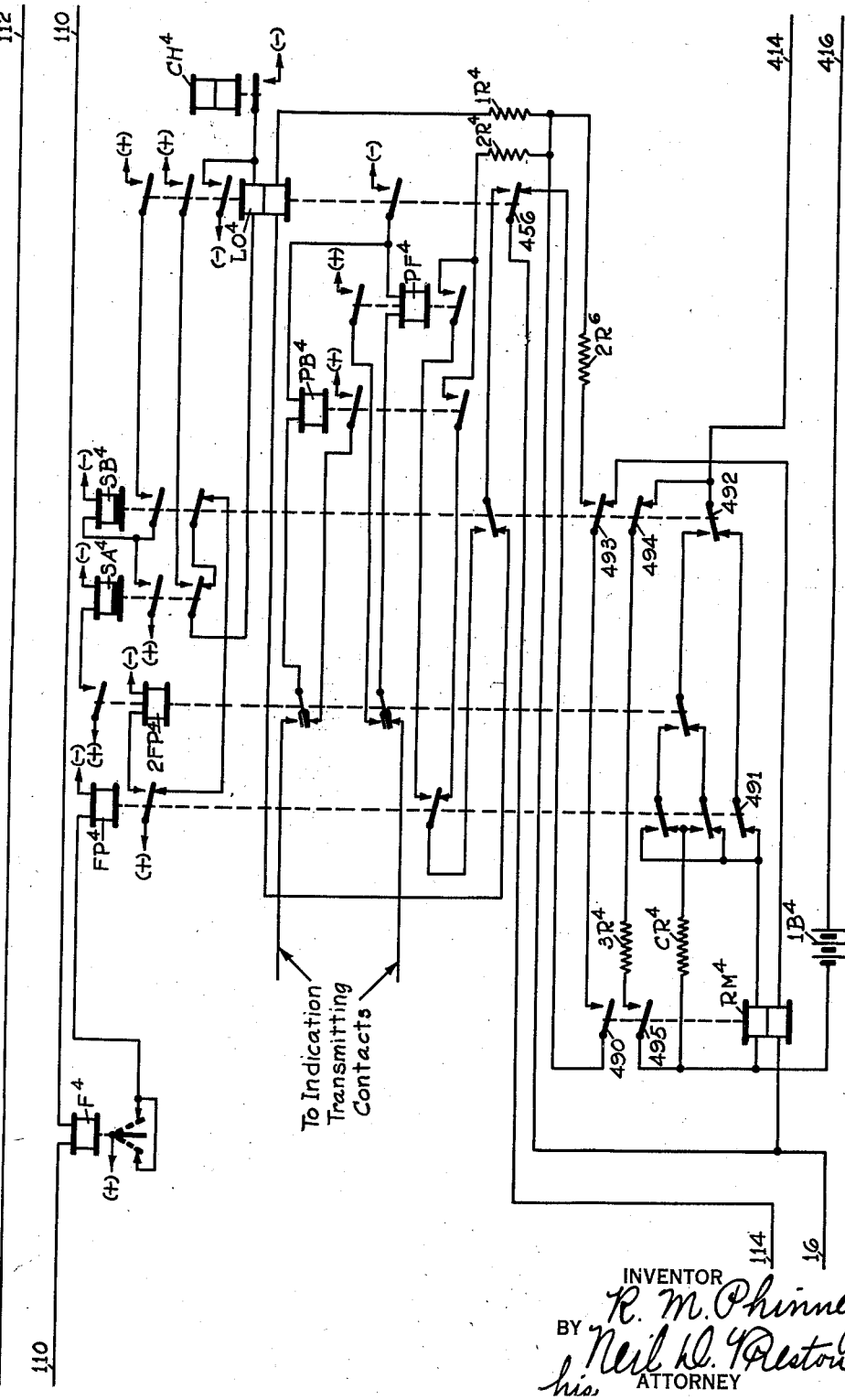

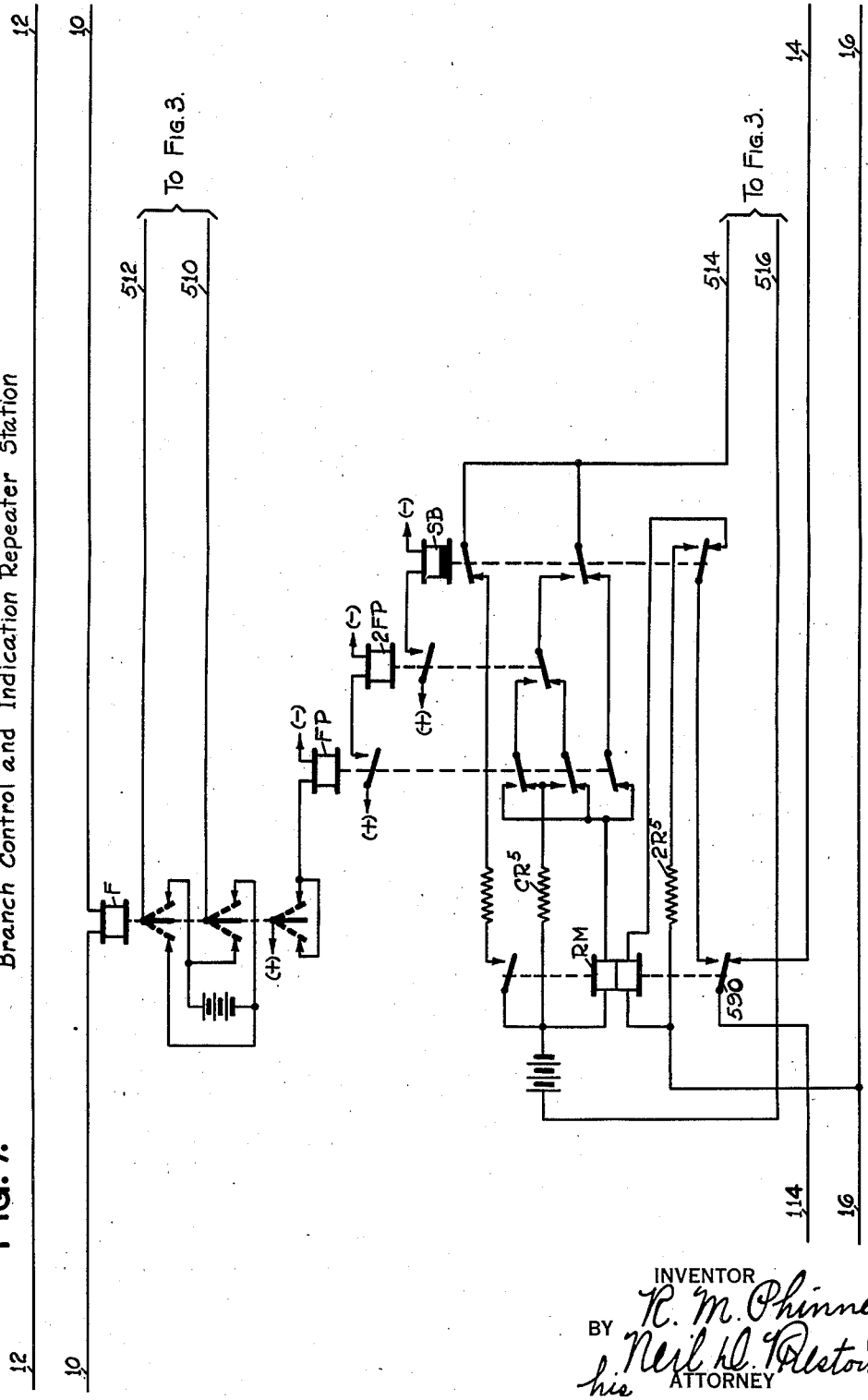

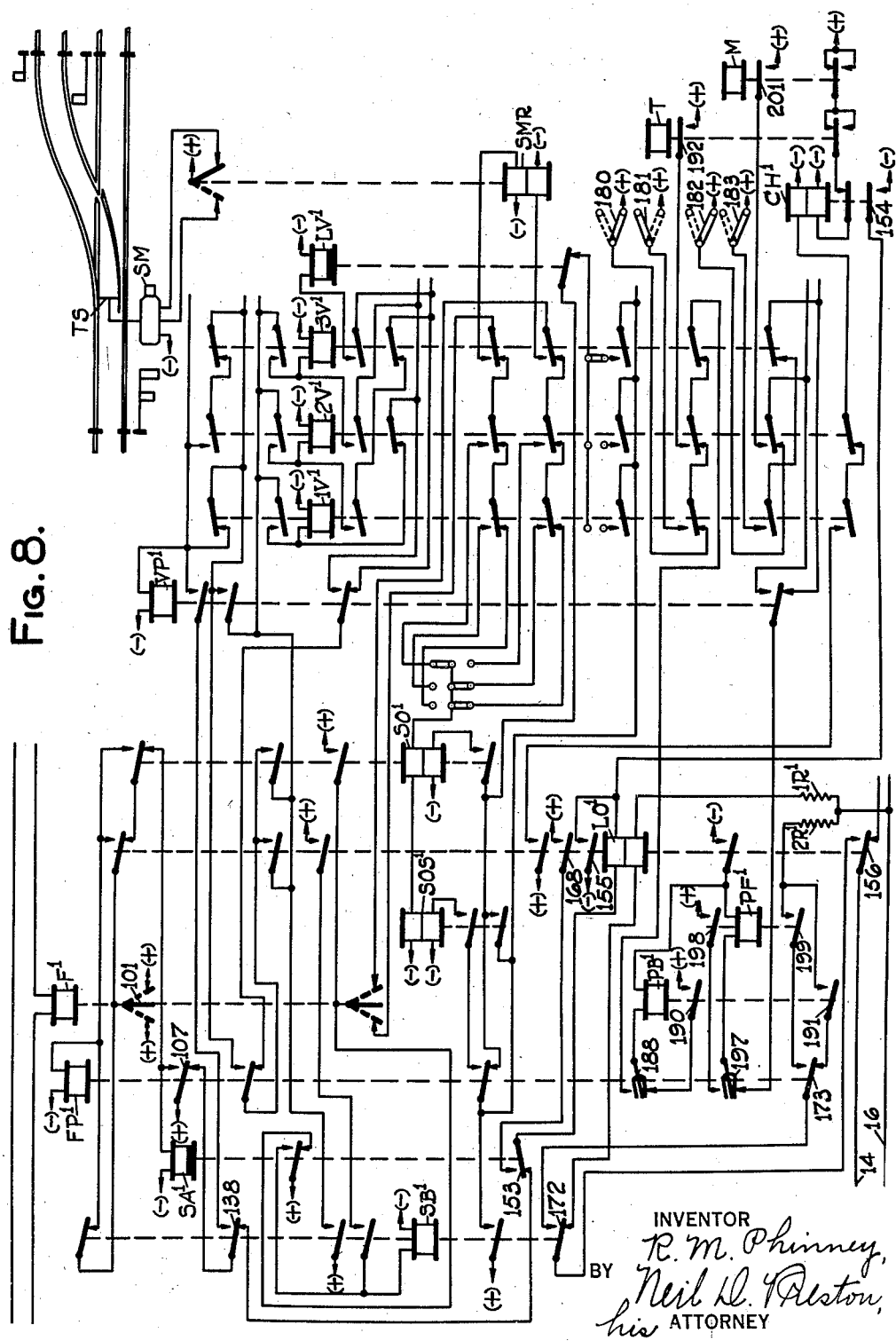

Patented June 1, 1937

2,082,742

UNITED STATES PATENT OFFICE 2,082,742

CENTRALIZED TRAFFIC CONTROLLING SYSTEM FOR RAILROADS

Robert M. Phinney, Rochester, N. Y., assignor to General Railway Signal Company, Rochester, N. Y.

Application December 27, 1934, Serial No. 759,396

10 Claims. (Cl. 177—353)

This invention relates to centralized traffic controlling systems for railroads and it more particularly pertains to the communication part of such systems.

By means of the centralized traffic controlling system contemplated by the present invention a central control office is placed in communication with a number of outlying field stations in such a way that controls may be transmitted to these field stations for governing the operation of traffic controlling devices located at the several stations. Likewise, the conditions of the various traffic controlling devices at each station are transmitted from the station to the control office to advise the operator of the location of trains and the condition of the traffic controlling devices, such conditions being transmitted as indications.

The present invention more particularly relates to a centralized traffic controlling system wherein the supervision of the traffic governing devices and the indication of their conditions are accomplished over a communication system comprising two line circuits, namely, a control line circuit and an indication line circuit. The present invention is more particularly directed to a traffic controlling system in which the distance between certain of the field stations and the control office is such that it is impractical to transmit impulses between the control office and these certain field stations because of the length of the line circuit.

An object of the present invention is the provision of a repeating circuit arrangement so that distant field stations may operate in connection with the communication system without the need of increasing the size of the line conductors beyond a reasonable amount. As a result of the repeating circuit arrangement provided in the present invention installation costs of a centralized traffic controlling system are reduced because it is possible to reduce the size of the line conductors. In other words, the present circuit arrangement is so arranged that when the limit of the minimum size of line wire is reached the line circuit will be repeated into another line circuit and this process can be repeated as often as required. This applies to the control circuit and the indication circuit.

Another object of the present invention is the provision of means at a station for extending the control and/or the indication line circuits by way of a first branch to one or more distant stations and also extending the control and/or the indication line circuits by way of a second branch to one or more other stations, with either or both the first and second branches repeated or not as required.

In some instances it is not necessary to repeat the control circuit at the same place that the indication circuit is repeated and in other instances both the control and indication circuits will be repeated at the same location. Futhermore, in some instances the control and indication line circuits may be repeated at locations where there is no field station and in certain other cases one, the other, or both of these line circuits will be repeated at locations where there is a field station apparatus.

Certain of these combinations have been diagrammatically indicated in one of the drawings in a manner which will be pointed out in detail.

The present invention contemplates the use of one or more repeater stations for repeating the control and indication impulses, as well as the lockout function, by means of the communication system. In addition to the repeater station or stations, regular stations are connected to the communication system either between the control office and the first repeater station or beyond the repeater station or stations.

The apparatus at the control office and at each field station is organized to be responsive to different series of impulses arranged in distinctive combinations in accordance with the character of the messages desired to be transmitted for selecting stations for outbound messages, for registering stations for inbound messages and for the transmission of the required control or indication messages after the station has been selected or registered. Each series of impulses causes the apparatus at the control office and at the field stations to operate through a cycle of operations. In the particular selector type system to which the present invention is applied, the selector apparatus at the several field stations is so controlled that it ceases to respond to impulses impressed on the control line circuit whenever the associated field station fails to be selected.

A control line battery, or other suitable source of current, is located in the control office for supplying impulses of positive and negative polarity in various combinations to operate the system through cycles of operations. During a cycle the regular field stations between the control office and the first repeater station are responsive to current impulses supplied from the control office line battery, while the regular field stations beyond the repeater station are responsive to current impulses supplied from a control line battery located at the repeater station.

Likewise, during the operation of the system through a cycle any field station may condition the indication line circuit in various combinations from an indication battery or source of current located in the control office for stations up to and including the first indication repeater station. The current for other stations farther out the line from the control office to condition the indication line circuit extending to those stations is derived from a battery or source of current located at the indication repeater station, with these conditions being repeated over the indication line circuit extending to the control office.

In other words, during a cycle for the transmission of controls and indications the control office impulses the line circuit which extends to the first control repeater station with current from the control office control line battery and the first repeater station repeats these impulses over the line circuit extending beyond this repeater station with current from the control line battery located at the repeater station. It will be obvious that more than one repeater station may be provided to meet practical requirements, in which event this repeating arrangement is extended as required. During the transmission of control impulses, the indication line circuit extending from the control office to the first indication repeater station is conditioned to make up indication code combinations if a station between the control office and the first indication repeater station (and including the repeater station) has indications to transmit. If an indication station beyond the first indication repeater station has indications to transmit then this station will condition the indication line with a code combination, which combination will be repeated by the indication repeater station to the indication line circuit extending from this station to the control office. It will be understood that this repeating arrangement may be extended to meet practical requirements.

Other objects, purposes and characteristic features of the present invention will be in part obvious from the accompanying drawings and in part pointed out as the description of the invention progresses.

In describing the invention in detail reference will be made to the accompanying drawings, in which like reference characters provided with distinctive exponents designate corresponding parts and in which:—

Figs. 1A to 1G inclusive are diagrammatic representations of various combinations of repeating arrangements applied to the control and indication line circuits leading from the control office to distant field stations.

Fig. 2 illustrates in a diagrammatic and conventional manner the application of the present invention to a control office associated with a control line circuit and an indication line circuit of the type disclosed, for example, in the pending application of Judge et al., Ser. No. 640,062, filed October 28, 1932, corresponding to the British Patent No. 419,399, dated November 12, 1934.

Fig. 3 illustrates in a diagrammatic and conventional manner a field station connected to the control line circuit and the indication line circuit in a communication system of the type disclosed, for example, in the above application Ser. No. 640,062, corresponding to the British Patent No. 419,399. This Fig. 3 illustrates the apparatus more particularly associated with the line circuits, which apparatus is shown as associated with a complete field station in Fig. 8 of the accompanying drawings.

Fig. 4 illustrates in a diagrammatic and conventional manner the application of the present invention to a control repeater station. The term control repeater station is used to identify a station which repeats the impulses in the control line circuit at a location where a field station is not provided.

Fig. 5 illustrates in a diagrammatic and conventional manner the application of the present invention to an indication repeater station. The term indication repeater station identifies a location where the control line impulses are not repeated, where the indication line circuit impulses are repeated and where there is no field station located.

Fig. 6 illustrates in a diagrammatic and conventional manner the application of the present invention to a repeater field station where the control line circuit impulses are not repeated but where the indication line circuit impulses are repeated and where there is a field station located.

Fig. 7 illustrates in a diagrammatic and conventional manner the application of the present invention at a repeater station where the control and indication line circuits are branched. One branch of both the control and indication line circuits (not repeated) leads to one or more distant field stations. Another branch of both the control and indication line circuits leads to another station or stations and is arranged to repeat the control and indication impulses to and from this other branch respectively.

Fig. 8 illustrates in a diagrammatic and conventional manner the detail circuits of a typical field station as shown in the communication system of the type disclosed, for example, in the above mentioned application Ser. No. 640,062, corresponding to British Patent No. 419,399. This Fig. 8 shows the relation of the apparatus of Fig. 3 to the complete field station.

For the purpose of simplifying the illustration and facilitating in the explanation, the various parts and circuits constituting the embodiment of the invention have been shown diagrammatically and certain conventional illustrations have been employed, the drawings having been made more with the purpose of making it easy to understand the principles and mode of operation, rather than with the idea of illustrating the specific construction and arrangement of parts that would be employed in practice. Thus the various relays and their contacts are illustrated in a conventional manner and symbols are used to indicate connections to the terminals of batteries or other sources of current instead of showing all of the wiring connections to these terminals.

The symbols (+) and (—) are employed to indicate the positive and negative terminals respectively of suitable sources of direct current and the circuits with which these symbols are used always have current flowing in the same direction. The symbols (B+) and (B—) represent the positive and negative terminals respectively of a suitable source of current having a center tap and the circuits with which these symbols are used have current flowing from the (B+) terminal to the center tap when such a circuit is completed and from the center tap to the (B—) terminal when this circuit is completed.

*Typical station arrangements.*—Fig. 1A illustrates a control office CO (see Fig. 2) connected to a field station FS (see Fig. 3) by means of a control circuit and an indication circuit. The control and indication circuits extend through the field station, the indication circuit terminating in another field station FS (the same as shown in Fig. 3) while the control circuit is repeated at a repeater station RS (see Fig. 4) with a separate control line circuit extending to the last field station FS.

Fig. 1B illustrates a layout similar to Fig. 1A except that the indication line circuit (see Fig. 5) is repeated at the repeater station RS, while the control line circuit extends through this station to an end field station FS which may be the same as illustrated in Fig. 3.

Fig. 1C is a combination of Figs. 1A and 1B with both the control and indication lines repeated at the repeater station RS. In other words, the control line circuit is repeated as shown in Fig. 4 and the indication line circuit is repeated as shown in Fig. 5. In Figs. 1A, 1B and 1C the field stations are indicated by the double rectangles and the repeater stations are indicated by the rectangles containing a cross. The reference character RS indicates a repeater station at a point where no field station is located.

Fig. 1D shows a control line circuit extending from a control office CO through a first field station FS to a control repeater station RS (see Fig. 4), with the repeated control line circuit extending through a repeater field station RFS (see Fig. 6) to a second repeater field station RFS (see Figs. 3 and 4), where the control line circuit is again repeated to an end field station FS. In this layout the indication line circuit extends from the control office through the first field station to the first repeater field station where the indication line circuit is repeated, with the repeated extension extending through the second repeater field station (without being repeated) to the end field station.

Fig. 1E indicates the control and indication line circuits extending to the four field stations FS represented by the double rectangles located in a direct line to the right of the control office. Between the second and the third field stations a repeater station RS is located which repeats both the control and indication line circuits to two other field stations represented by the double rectangles in the upper row of two.

Fig. 1F indicates how the control and indication line circuits may extend from the control office CO, through a first field station FS and a second field station FS to a repeater field station RS (all indicated in a straight line to the right of the control office), with the control and indication line circuits repeated at this repeater field station to an end field station FS. Between the first and second field stations a repeater field station RFS is located which repeats the control and indication line circuits into a branch leading through a first field station FS located in the upper row, to a repeater field station RFS where the control line circuit is repeated to an end field station FS in this upper row, while the indication line circuit extends through this repeater field station to the end station without being repeated.

*Operation of Fig. 1A.*—It will be convenient to first describe the operation of a system laid out as indicated in Fig. 1a. As indicated in this figure, Fig. 2, Fig. 3 and Fig. 4 should be placed end to end with correspondingly numbered lines in alinement. Since the end field station is the same as shown in Fig. 3 it is not believed necessary to duplicate this drawing, since the operation of the system will be readily understood by shifting Fig. 3 to the right of Fig. 4 as indicated.

The line circuits of a selector type system, such as disclosed in the above mentioned pending application Ser. No. 640,062 corresponding to British Patent No. 419,399, are modified as disclosed in the patent of W. D. Hailes, Patent No. 2,045,908, dated June 30, 1936. The Hailes patent discloses a circuit arrangement for precharging the indication line circuit during stepping of the system to overcome any tendency for an indication line with considerable distributed capacity to transmit a false indication. The resistance unit $CR^0$ and the circuit arrangement including back contact 175 and front contact 206 of relay FP in Fig. 2 is for the purpose of applying this precharge.

In a system of the character disclosed in the above mentioned application Ser. No. 640,062, corresponding to British Patent No. 419,399, the field stations and control office are interconnected by four line wires 10, 12, 14 and 16. The line wires 10 and 12 are connected together at the last field station in the system as indicated by the dotted line tie in the upper right hand portion of Fig. 3. It will be understood that when the field station of Fig. 3 is used as the first field station this tie is omitted. When Fig. 3 is the end station the tie is included.

Line conductor 10 is energized with positive and negative impulses from a control battery CB in the control office for the purpose of transmitting controls and for the purpose of causing the synchronous step-by-step operation at the control office and at the several field stations. Conductor 12 is the control return line. The line wire 10 includes a three-position polar relay F (with suitable exponent) at the control office and at each field station which repeats the impulses of each series. The particular polarity of the impulses of each series placed upon the control or stepping circuit is determined by polarity selecting relays PC and NC, which determine respectively whether the impulses are positive or negative in character. The duration of each impulse of a series, as well as the time spaces between such impulses are determined in accordance with the operation of an impulse relay EP.

At the control office each impulse is repeated by relay F and irrespective of the polarity of such impulse it is also repeated by a line repeating relay FP. A second line repeating relay 2FP is provided for repeating relay FP. A slow acting relay SA is provided for marking off the different series of impulses by being picked up at the beginning of each series and by dropping at the end of each series. This is accomplished by making relay SA slow acting so that it is slightly slow in picking up upon the first impulse of each series but is much slower in dropping away, in order that it will maintain its contacts picked up during the time spaces between impulses of a series. A similar slow acting relay 2SA repeats relay SA.

Similar relays are provided at each of the field stations but for convenience only relays $F^1$, $FP^1$, $SA^1$ and $SB^1$ have been shown at the field station illustrated in Fig. 3, since this station is typical of all field stations. At the control repeater station (not a field station) the repeating relays are not provided because the only function of a control repeater station is to repeat the impulses from one control line circuit to another.

The indication line circuit, comprising line wires 14 and 16, is energized from an indication battery IB in the control office and has included therein message receiving relays MF and MB which are respectively controlled through front and back contacts of relays FP and 2FP, as well as through front and back contacts respectively of a dividing relay DV controlled by relay EP. A charging resistor $CR^0$ is provided for precharging the indication line as mentioned.

The indication line wire 14 extends to all of the field stations, normally including a back contact of the lockout relays such as back contact 156 of lockout relay $LO^1$ shown in Fig. 3. It will be obvious that in a system laid out as per Fig. 1A, indication line conductor 14 extends from the first field station, through back contact 156, straight through the control repeater station by way of conductor 114 to the end field station by way of conductor 14 (when Fig. 3 is placed to the right of Fig. 4), where this line remains open ended at back contact 156 of the lockout relay at the end station. Indication return line conductor 16 is continuous from the control office to the end station.

When a particular field station is transmitting, the lockout relay at that station is picked up, as well as the slow acting repeating relays (relays $LO^1$, $SA^1$ and $SB^1$ for example), thereby rendering the open or closed conductive condition of the indication line circuit dependent upon the control of either relay $PF^1$ or $PB^1$ in accordance with whether the stepping line circuit is energized or de-energized, resulting in relay $FP^1$ being picked up or dropped away respectively.

It will be understood that there is often considerable distance between the control office and the outlying field stations, in which case the distributed capacity of the indication line circuit is sufficiently high to cause troublesome line charging surges when energy from battery IB is applied to the line. The precharging arrangement whereby such troublesome line charging surges are rendered ineffective to cause the false operation of a message relay, such as relay MF or MB of Fig. 2, will be pointed out in the following description.

Although only a part of the whole communication system has been disclosed, it is believed that the features of the present invention will be readily understood in connection with the following description of the operation, it being understood that the features relative to a communication system of this character have been fully disclosed in the above mentioned application Ser. No. 640,062, and the features relative to the precharging function have been fully disclosed in the above mentioned Patent No. 2,045,908.

However, for convenience in describing the invention Fig. 3 of the accompanying drawings shows only the apparatus of a typical field station which is directly associated with the line circuits, which apparatus has been shown in detail in Fig. 8 of the accompanying drawings as associated with the complete field station devices. Corresponding devices have been given corresponding reference characters. This Fig. 8 shows a typical track switch TS controlled by a switch machine SM which, in turn, is governed by the switch machine control relay SMR through the medium of the communication system. A track relay T is shown which is assumed to be associated with the detector track section associated with the track switch TS. A signal at stop relay M is also shown. The field station apparatus disclosed in this Fig. 8 also includes a stepping relay bank having stepping relays $1V^1$, $2V^1$, $3V^1$ and $LV^1$ together with a half step relay $VP^1$. Station selecting relays $SO^1$ and $SOS^1$ are also included. This figure has been shown to disclose the manner in which the apparatus associated with the line circuits is included in a complete field station, but the operation of a complete field station will not be considered in detail herein as a description of such operation has been fully given in the above mentioned prior application Ser. No. 640,062 corresponding to British Patent No. 419,399.

With the system in its normal condition the line circuits are de-energized and the communication system is at rest. The control line circuit extending from the control office through the first field station to the control repeater station is de-energized by reason of the dropped away conditions of relays PC and NC in the control office. The control line circuit including conductors 112 and 110 extending from the control repeater station to the end station are de-energized due to the contacts of relay $F^2$ of Fig. 4 being in their neutral positions.

The indication line circuit including relays MF and MB is de-energized during the normal condition of the system due to the open circuit condition of the indication line at the end field station as illustrated by conductors 114 and 16 of Fig. 3 (when placed at the right end of the layout).

Upon the initiation of the system from the control office by means not shown in the drawings, a series of impulses of distinctive polarities are placed upon the stepping line circuit to comprise a cycle of operations. The characters of these impulses are determined in accordance with code jumpers and control levers so as to select a particular station and to determine the controls for that station. The code jumper or control lever for each step, through suitable circuit means, picks up either the PC or the NC relay for that step depending upon whether the particular impulse is to be positive or negative in character.

For a cycle of operations for the transmission of indications the system is initiated from the station having indications to transmit by the dropping of relay $CH^1$ (see Fig. 3), which closes a circuit for picking up lockout relay $LO^1$ extending from (+), back contact 107 of relay $FP^1$, back contact 138 of relay $SB^1$, back contact 153 of relay $SA^1$, upper winding of relay $LO^1$ and back contact 154 of relay $CH^1$, to (−). Relay $LO^1$ completes a circuit for its upper winding to (−) at its front contact 155, which circuit is independent of contact 154 of relay $CH^1$.

The closure of front contact 156 energizes the indication line circuit from the calling field station to the control office over a circuit extending from the (+) terminal of battery IB, back contact 157 of relay DV, lower winding of relay MB, back contact 158 of relay $2SA$, line conductor 14, front contact 156 of relay $LO^1$, back contact 172 of relay $SB^1$, lower winding of relay $LO^1$, resistance $IR^1$ and conductor 16 to the (−) terminal of battery IB. The current flowing in this circuit picks up relay MB which closes a stick circuit for itself extending from (+), back contact 203, of relay EP, front contact 204 and upper winding of relay MB, to (−).

The picking up of relay MB initiates the system into a cycle of operations by means not disclosed in the present drawings but which may be the same as disclosed in the above mentioned prior application Ser. No. 640,062. For a cycle of operations for the transmission of indications alone the impulses placed upon the stepping line circuit are all of one character, so that one of the polarity determining relays of Fig. 2 is picked up at the beginning of a cycle and it is maintained picked up until the end of that cycle.

At the beginning of a cycle (irrespective of the type of cycle) one of the polarity determining relays PC or NC is picked up to place an impulse upon the stepping line circuit. This is repeated by the line relays F (with suitable exponents) at the control office and at each field station as well as by their respective line repeating relays FP (with suitable exponents). After this impulse has been applied for a predetermined period of time sufficient for the slow acting relays SA, 2SA and SB at the control office and at the field stations to be picked up, the stepping line circuit is opened by contact 52 of relay EP. When a sufficient period has elapsed for the time space following the first impulse, back contact 52 of relay EP is again closed.

Therefore, contacts 50, 51, 53 and 54 of relays PC and NC act as pole changers so that particular polarities are placed upon the stepping line circuit from control battery CB, while back contact 52 of relay EP intermittently operates to space the impulses of a cycle. In this connection it may be pointed out (as clearly disclosed in Ser. No. 640,062) that relays PC and NC assume their positions for each impulse while back contact 52 of relay EP is open preceding each impulse, with relays PC and NC remaining in their selected conditions during the time that the impulse is applied to the control line circuit by the closure of back contact 52.

As previously mentioned, relay FP in the control office repeats each impulse placed upon the stepping or control line circuit by reason of a circuit closed by contact 67 of relay F irrespective of the character of energization of line relay F. Similarly, each energization of relay FP is repeated by relay 2FP by reason of the closure of front contact 68. Similarly, front contact 69 of relay 2FP controls relay SA and front contact 80 of relay SA controls relay 2SA. At the field station relay FP¹ repeats line relay F¹ by reason of its control by contact 101.

At the beginning of a cycle, following the response of relay SA to the first impulse (which is slightly longer than the rest), relay DV is made subject to relay EP. More specifically, each time relay EP is de-energized to impulse the control line circuit relay DV is energized over a circuit extending from (+), front contact 177 of relay SA, back contact 178 of relay EP and winding of relay DV, to (—).

Assuming that relays LO¹ and SB¹ are picked up at the beginning of a cycle so that the field station of Fig. 3 is conditioned to transmit, then during each time space in the series of impulses the positive terminal of battery IB is connected to line wire 14 through the lower winding of relay MB and the indication line circuit is dependent for its closed or open conductive condition upon front contact 191 of relay PB¹. More specifically, assuming front contact 191 to be closed, a circuit is completed from the positive terminal of battery IB, back contact 157 of relay DV, lower winding of relay MB, back contact 206 of relay FP, back contact 176 of relay 2FP, conductor 14, front contact 156 of relay LO¹, front contact 172 of relay SB¹, back contact 173 of relay FP¹, front contact 191 of relay PB¹, resistor 2R¹ and line conductor 16 to the (—) terminal of battery IB.

On the other hand, during each impulse placed upon the stepping line circuit the indication line circuit is dependent for its closed or open conductive condition upon front contact 199 of relay PF¹. More specifically, assuming contact 199 to be closed, the indication line is energized over a circuit extending from the (+) terminal of battery IB, front contact 157 of relay DV, lower winding of relay MF, front contact 175 of relay FP, front contact 176 of relay 2FP, line conductor 14, front contact 156 of relay LO¹, front contact 172 of relay SB¹, front contact 173 of relay FP¹, front contact 199 of relay PF¹, resistor 2R¹ and line conductor 16 to the (—) terminal of battery IB.

In brief, during the time spaces of each series of impulses message receiving relay MB is controlled in accordance with the open or closed condition of front contact 191 of relay PB¹, while during the impulses of each series, message receiving relay MF is controlled in accordance with the open or closed condition of contact 199 of relay PF¹.

For each time space in a series of impulses placed upon the stepping or control line circuit, including conductors 10 and 12, a step-by-step mechanism at the control office and at each field station is caused to take one step. This step-by-step operation is controlled through contacts of relays SA and 2FP in the control office and through contacts of the SB and FP relays, such as relays SB¹ and FP¹ of the illustrated field station. This control is not shown in the present embodiment since it forms no part of the present invention and since it may be the same as disclosed in the above mentioned prior application 640,062.

In accordance with the present invention the impulses applied to the control line circuit are repeated by relay F² at the control repeater station, this relay being actuated to the right in response to a (+) impulse and to the left in response to a (—) impulse. When relay F² is actuated to the right it applies a (+) impulse to the line extending from this control repeater station to the next station or stations in the layout. This (+) impulse is completed over a circuit extending from the (+) terminal of battery CB² (see Fig. 4) contact 251 of relay F² in its right hand dotted position, line conductor 110 (assumed to be connected to a line conductor such as 10 of Fig. 3) winding of the line relay or relays of the distant station or stations, by way of the tie at the last station, conductor 12, conductor 112 and contact 253 of relay F² in its right hand dotted position to the (—) terminal of battery CB². It will be obvious that the operation of relay F² to the left in response to a (—) impulse reverses the polarity from battery CB² to provide a (—) impulse in the distant line circuit.

Through the medium of the contacts on the step-by-step mechanism, relays PF¹ and PB¹ at the transmitting field station are caused to be selectively energized in accordance with the positions of the devices from which indications are to be transmitted to the control office. Relay PF¹ is positioned during a time space in accordance with the indication it is to transmit on the next impulse period. Relay PB¹ is positioned during each impulse period in accordance with the indication it is to transmit on the next time space. Thus on each step taken by the step-by-step mechanism at a transmitting field station relays PF¹ and PB¹ govern the indication line circuit.

While these selecting circuits are not shown in Fig. 3 it will be understood that the conductors indicated "to indication transmitting contacts" which lead through make-before-break contacts 188 and 197 of relay FP¹ to relays PB¹ and PF¹ refer to correspondingly numbered contacts in the Fig. 8 of the accompanying drawings, which conductors lead through contacts of the stepping relay bank so as to have the proper indication contacts connected thereto for the several steps. These indication contacts are shown as including contacts 180, 181, 182, 183, 192 and 201 as typical of such indication contacts in an actual system. The operation of such contacts in the system has been described in detail in the above mentioned application Ser. No. 640,062. Likewise the closure of front contact 189 of relay LO¹ applies (—) potential to the windings of relays PB¹ and PF¹ so that they will not be actuated at any station except the one which is transmitting as marked by its lockout relay being picked up. Stick contacts 190 and 198 correspond to the same contacts in the above mentioned application and are for the purpose of sticking these relays under certain conditions fully explained in the above application but which is not material to an understanding of the present invention.

Message receiving relays MB and MF are effective to control indication storing relays on each step taken by the step-by-step mechanism in the control office. For example, relay MB is positioned during each time space marked off on the stepping line circuit in accordance with the position of contact 191 of relay PB¹ and this position is maintained during the following energized period of the stepping line circuit so as to suitably position an indication storing relay in accordance with the energized or de-energized condition of relay MB during each impulse period. The stick circuit for maintaining relay MB in its picked up position (in the event it is picked up on a particular step) extends through front contact 204 of relay MB to (+) at back contact 203 of relay EP as well as to (+) at front contact 202 of relay 2FP.

Relay MF is positioned in accordance with the position of contact 199 of relay PF¹ at the transmitting station during each impulse period marked off on the stepping line circuit and the position of relay MF is maintained during the following time space so as to suitably position an indication storing relay in accordance with the energized or de-energized condition of relay MF during such time space. More specifically, the stick circuit for relay MF is completed by way of its front contact 207 to (+) at front contact 203 of relay EP as well as to (+) at back contact 202 of relay 2FP.

Relay MB controls its respective indication storing relays during the impulse periods marked off on the stepping line circuit by reason of its contact 210, through which (B—) or (B+) is connected to the indication storing relays by way of front contact 205 of relay FP. Relay MF controls its respective indication storing relays during the time space periods marked off on the stepping line circuit by selectively connecting (B—) or (B+) by way of its contact 217 and back contact 220 of relay FP to the indication storing relays. It will be understood that the indication storing relays are selected by the control office step-by-step mechanism, as shown in Fig. 2, although the indication storing relays have been merely indicated by the legend "two indication storing relays". It is believed unnecessary to disclose the manner in which these indication storing relays are connected to the wires leading from the stepping relays, as such features have been fully disclosed in the prior application Ser. No. 640,062 above mentioned.

During the shift from one impulse period to a time space period or vice versa, there is an interval of time during which the indication line circuit is not energized from battery IB. During this time the distributed capacity of the indication line circuit may become discharged by reason of the closed condition of one of its controlling contacts at a field station. Thus at the beginning of each period which follows a period during which the indication line circuit has been conductively closed at a field station, a charging current of sufficient value to operate the message receiving relay, which is connected in the indication line circuit at this particular period, may flow. All of the combinations under the above mentioned condition will not be discussed in detail since these combinations have been fully explained in the above mentioned Patent No. 2,045,908.

It will merely be pointed out that charging resistor CR⁰ provides a circuit from the positive terminal of battery IB, through back contact 175 of relay FP (under one condition) or through front contact 206 of relay FP (under another condition), front or back contact 176 of relay 2FP (depending upon whether it is an impulse or a space period), to line wire 14 which allows a charging current to flow for charging the distributed capacity in the transmission line circuit. This charging current charges the distributed capacity of the line to a sufficient value prior to the inclusion of the winding of the message relay (MF or MB) in the indication line circuit. This absorbs most all of the charging surge of current so that the current flow over the indication line circuit when the message relay is connected therein is below the pick-up value of the relay unless the indication line circuit is closed at the transmitting field station, under which condition it is of course necessary that the message relay be energized.

It may happen that two or more field stations register a change in indication conditions at the same time as, for example, the dropping of two or more change relays such as relay CH¹ of Fig. 3 before the system leaves its lockout position. The lockout arrangement at the field station is the same as disclosed in the above mentioned application 640,062, in that lockout means are provided at each field station effective to select the station nearest the control office having new indications to transmit at the beginning of a cycle.

The system has what may be termed an initiating period and a lockout period at the beginning of each cycle of operations. The initiating period may be said to include the time which elapses between the occurrence of a change in conditions, either at the control office or at a field station, up to the instant that the quick acting line repeating relays FP (with suitable exponents) at the control office and at each field station pick up their contacts in response to the first impulse applied to the stepping line circuit. The lockout period may be considered as that time which elapses between the actual picking up of the contacts of the FP relays (with suitable exponents) and the picking up of their respective slow acting relays SA (with suitable exponents).

With reference to Fig. 3 it will be apparent that the closure of two or more back contacts, such as back contact 154 of relay CH¹ at different field stations (with the system in its normal condition) will simultaneously energize the lockout relays at these stations. However, during the lockout period only the lockout relay at the station nearest the control office will remain picked up, which results in the selection of that particular station for the transmission of indications. The other station or stations are locked out until the beginning of the next cycle when they get their chance at the communication system.

More specifically, assuming that relay LO¹ at the first field station is picked up and that a similar relay at the end field station is picked up at the same time. Indication line conductor 14 at the first field station is connected to the indication line return conductor 16 by reason of closed front contact 156 of relay LO¹. The lockout relay at the next field station cannot close an energizing circuit for its lower winding because of open back contact 156 at the first station which disconnects energy from the line leading to the more distant stations.

During the lockout period relay LO¹ of the first field station will be selected because it will be maintained energized subsequent to the picking up of back contact 107 of relay FP¹ by reason of an energizing circuit through its lower winding, which includes the indication line circuit and which energizing circuit may be traced through front contact 156 of relay LO¹, back contact 172 of relay SB¹, lower winding of relay LO¹ and resistor IR¹ to the indication line return conductor. This energizing circuit through the lower winding of relay LO¹ is maintained until after its stick circuit is completed by the picking up of relay SA because relay SB¹ is not picked up until a short interval of time after the picking up of relay SA¹. This stick circuit which extends from (+), front contact 168 of relay LO¹, front contact 153 of relay SA¹, upper winding of relay LO¹ and front contact 155 of relay LO¹, to (−) is maintained complete throughout a cycle of operations.

The lockout relay at the distant station will drop away during the lockout period since it has no selecting circuit made up over the indication line circuit. More specifically, when relay FP¹ at the distant station opens its back contact 107 the lockout relay at this station will be de-energized because there is no energy connected to the indication line circuit leading to this station for maintaining its lockout relay energized by way of its lower winding.

No lockout relay, irrespective of its location, can be picked up subsequent to the picking up of the associated FP relay because of open back contacts similar to back contact 107 at the beginning of the cycle and because of open back contacts 138 and 153 of relays SB¹ and SA¹ respectively which are maintained open throughout the cycle.

Resistance units IR¹ and 2R¹ of Fig. 3 are provided to compensate for the relative distances from the control office at which the various stations are located and for compensating for the removal of the lower winding of the lockout relay by the picking up of a corresponding SB relay. Resistance 2R¹, for example, at the end field station will be equivalent to the resistance of the lower winding of the lockout relay at this station, since this resistance is substituted for the lower winding during the transmission of indications. This maintains a uniform resistance value of the indication line circuit. At the end field station there will be no resistance IR¹ but at each field station nearer the office a resistance unit such as IR¹ will be provided gradually increasing in resistance value to compensate for the resistance of the indication line circuit between the associated station and the end of the system. Resistance unit 2R¹ at the various field stations is of a value to compensate for the resistance of the distant indication line circuit plus the resistance of the lower winding of the associated lockout relay.

*Operation of Fig. 1B.*—In an installation of a system as illustrated in Fig. 1B the control office is connected through a first field station to an end field station with the control line circuit not being repeated, while the indication line circuit is repeated at an indication repeater station (as illustrated in Fig. 5) and located between the first and last field stations. In an installation of this type the indication repeater station is for the purpose of repeating from one indication line into another at a location where there is no field station.

With Figs. 2, 3 and 5 laid out as indicated in Fig. 1B it is believed obvious that the stepping and control operations are the same as previously described in connection with Fig. 1A. Likewise the operation of the indication line circuit from the first field station to the control office is the same as previously described. Therefore these portions of the operation of the system need not be repeated.

Referring to Fig. 5 it will be understood that relays F³, FP³, 2FP³ and SB³ are provided to take care of the lockout and indication line circuit conditions at this station. It is believed that the operation of the system under this condition may be clearly understood by placing Fig. 3 to the right of Fig. 5 and assuming that an exact duplicate of Fig. 3 is interposed between Fig. 2 and Fig. 5.

Under this assumption it will first be assumed that the first field station has indications to transmit and that relay LO¹ is picked up as a result of the initiation of the system at this station. The opening of back contact 156 of relay LO¹ interrupts the indication line conductor 114 leading to the indication repeater station so that a station farther out the line with indications to transmit during the same cycle will be locked out. This is because no energy is applied to line conductor 114 for maintaining relay RM energized during the lock-out period. With contact 295 of relay RM open during the lock-out period no energy is applied to line conductor 214, so that a picked up lock-out relay at any station beyond the indication repeater station will be de-energized.

It will now be assumed that the end field station (Fig. 3) has indications to transmit. The dropping of relay CH¹ will energize relay LO¹ as previously described and the system will be initiated when front contact 156 of relay LO¹ is closed, because this completes a circuit for energizing relay RM at the indication repeater station. Relay RM in closing its front contact 290 energizes the indication line circuit extending to the control office for picking up relay MB which initiates the system. More specifically, the closure of front contact 156 at the end field station energizes relay RM at the indication repeater station over a circuit extending from the (+) terminal of battery IB³, upper winding of relay RM, back contact 291 of relay FP³, back contact 292 of relay SB³, conductor 214 of Fig. 5, conductor 14 of Fig. 3, front contact 156 of relay LO¹, back contact 172 of relay SB¹, lower winding of relay LO¹, resistance IR¹, indication return line conductor 16 and indication return line conductor 216 to the (−) terminal of battery IB³.

The picking up of relay RM of Fig. 5 energizes the indication line circuit between the indication repeater station and the control office over a circuit extending from the (+) terminal of battery IB, back contact 157 of relay DV, lower winding of relay MB, back contact 158 of relay 2SA, conductor 14, back contact 156 of relay LO¹, (at the first field station, Fig. 3) conductor 114, front contact 290 of relay RM, back contact 293 of relay SB³, lower winding of relay RM and conductor 16 to the (−) terminal of battery IB. This results in the energization of relay MB to initiate the cycle.

In response to the initiation of the cycle the control line circuit, including conductors 10 and 12, is energized for picking up the line and line repeater relays in the control office and at all stations. During the lockout period, that is, during the interval between the picking up of relays FP¹ and SA¹ at the end field station, relay LO¹ at this station is energized by way of its lower winding and over the indication line circuit to battery IB³ at the indication repeater station. The picking up of back contact 291 of relay FP³ at the indicator repeater station interrupts the above described circuit through the lower winding of relay LO¹, but a substitute circuit for maintaining relay LO¹ energized extends from conductor 214 of Fig. 5, back contact 294 of relay SB³, resistance 3R³ and front contact 295 of relay RM to the (+) terminal of battery IB³.

At the termination of the lockout period, relay LO¹ at the end station is stuck up over its previously described stick circuit including front contact 153 of relay SA¹, and front contact 168 of relay LO¹. When relay SB at the end field station closses its front contact 172 the indication line is in condition to be conditioned in accordance with the operation of relays PB¹ and PF¹ for the transmission of indications. The circuit through resistance 3R³ of Fig. 5 is provided for establishing a closed path for the distant lockout relay or relays so that these lockout relays can be energized from battery IB³.

The transmission of indications under the present assumed condition takes place during the impulse and the time space periods as before. During each time space in the series of impulses the (+) terminal of battery IB³ is connected to indication line conductor 214 through the upper winding of relay RM and the indication line circuit between the indication repeater station and the end field station is dependent for its closed or open conductive condition upon front contact 191 of relay PB¹ at the end station. More specifically, assuming front contact 191 of relay PB¹ to be closed, a circuit is completed from the (+) terminal of battery IB³, upper winding of relay RM, back contact 296 of relay FP³, back contact 297 of relay 2FP³, front contact 292 of relay SB³, conductor 214, conductor 14, front contact 156 of relay LO¹, front contact 172 of relay SB¹, back contact 173 of relay FP¹, front contact 191 of relay PB¹, resistance 2R¹, conductor 16 and conductor 216 to the (−) terminal of battery IB³.

Under this condition (front contact 191 of relay PB¹) closed relay RM is energized during the time space period. The picking up of relay RM is effective to energize relay MB to register this condition over a circuit extending from the (+) terminal of battery IB, (Fig. 2) back contact 157 of relay DV, lower winding of relay MB, back contact 206 of relay FP, back contact 176 of relay 2FP, conductor 14, back contact 156 of relay LO¹ (at the first field station), conductor 114, front contact 290 of relay RM, front contact 293 of relay SB³, resistance 2R³ and conductor 16 to the (−) terminal of battery IB. Current flowing over this circuit energizes relay MB. If front contact 191 of relay PB¹ at the end field station is open during this time space then relay RM is not energized and since its front contact 290 is not closed relay MB in the control office is not energized. This explains how a choice of two indications are transmitted to the indication repeater station and then repeated to the control office during a time space period.

On the other hand during each impulse placed upon the stepping line circuit, the indication line circuit extending to the end field station is dependent for its closed or open conductive condition upon contact 199 of relay PF¹. More specifically, assuming front contact 199 closed the indication line circuit is energized from the (+) terminal of battery IB³, upper winding of relay RM, front contact 298 of relay FP³, front contact 297 of relay 2FP³, front contact 292 of relay SB³, conductor 214, conductor 14, front contact 156 of relay LO¹ at the end field station, front contact 172 of relay SB¹, front contact 173 of relay FP¹, front contact 199 of relay PF¹, resistance 2R¹, conductors 16 and 216 to the (−) terminal of battery IB³. This energizes relay RM to transmit one indication condition during the impulse period and if front contact 199 of relay PF¹ is open, relay RM is not energized during this impulse period to transmit the other indication condition.

With relay RM energized for the impulse period, indication relay MF in the control office is energized over a circuit extending from the (+) terminal of battery IB, front contact 157 of relay DV, lower winding of relay MF, front contacts 175 and 176 of relays FP and 2FP, conductor 14, back contact 156 of relay LO¹ at the first field station, conductor 114, front contact 290 of relay RM, front contact 293 of relay SB³, resistance 2R³ and conductor 16 to the (−) terminal of battery IB. With relay RM de-energized for the transmission during an impulse period the above described circuit is open at contact 290 so that relay MF is not energized. The above example indicates how a choice of two indications is transmitted from the end field station and repeated to the control office during an impulse period.

Since relay MB and MF function to register on the indication storing relays the received indication conditions in the same manner as previously explained it is believed unnecessary to repeat this explanation. It will thus be seen that it is not necessary to provide a step-by-step mechanism at the indication repeater station when this station is not a field station having controls and indications, but only the apparatus illustrated in Fig. 5 is necessary to accomplish the lockout and indication repeating operation. Resistance CR³ of Fig. 5 connected to the indication line conductor 214 by way of contacts 296, 297 and 298 of relays FP³ and 2FP³ is included in the charging circuit for charging the distributed capacity of the indication line circuit extending beyond the indication repeater station. Since this charging operation is the same as described in connection with contacts 175, 176 and 206 of relays FP, 2FP and resistance CR⁰ in the control office it is believed unnecessary to point out in detail this feature as applied at the indication repeater station.

*Operation of Fig. 1C.*—In a layout as indicated in Fig. 1C the control office is connected through a first field station and a repeater station to an end field station. In this example the repeater station is one which repeats the control impulses as indicated and explained in connection with Fig. 4. The indication impulses are likewise repeated at this station as indicated and explained in connection with Fig. 5. In other words, the control repeating contacts 251 and 253 of Fig. 4 are associated with relay F³ of Fig. 5 to repeat the control line impulses and the remainder of the circuit at the repeater station is that of Fig. 5. Since the operations of Fig. 4 and Fig. 5 have been explained it is believed unnecessary to explain the operation of Fig. 1C in detail since an installation of this type is simply a combination of Fig. 1A and Fig. 1B.

*Operation of Fig. 1D.*—In this example, the control office is connected through a first field station (Fig. 3) with the control line circuit repeated at a first repeater station as in Fig. 4, while the indication line circuit extends past this repeater station to a first repeater field station (Fig. 6). At the first repeater field station the control line circuit is not repeated but extends to a second repeater field station where the control line circuit is repeated. At the second repeater field station the indication line circuit is not repeated. From the second repeater field station both the control and indication line circuits extend to an end field station (Fig. 3).

Since the operation of the first field station and the first repeater station in this instance is the same as Fig. 1A this portion of Fig. 1D need not be described. Similarly the operation of the end field station (Fig. 3) is the same as the operation of the end field station in Figs. 1A and 1B as far as the transmission of indications and the operation of the control line circuit is concerned, so that the operation of the end field station in Fig. 1D need not be explained in detail. Only that portion of the operation as relates to the repeater field stations included in this layout will be pointed out.

By placing Fig. 3 to the right of Fig. 2, Fig. 4 to the right of Fig. 3 and Fig. 6 to the right of Fig. 4 with correspondingly numbered lines in alinement the system will be connected up as in Fig. 1D up to the first repeater field station. The second repeater field station is a combination of Figs. 3 and 4 since it is a field station as in Fig. 3 with the indications not repeated but with the controls repeated as in Fig. 4. It will therefore be obvious that a combination of Figs. 3 and 4, (that is Fig. 3 with the control line repeated as in Fig. 4) will be provided at the second repeater field station.

Fig. 6 is a combination of Figs. 3 and 5. The circuits of the F, FP, SA, SB, PB, PF and CH relays (with suitable exponents) are the same as the corresponding relays of Fig. 3. Likewise, the 2FP relay of Fig. 5 has been added to Fig. 6 and the circuits of Fig. 5 included in the lower portion of Fig. 6, all of which provides an indication repeater field station at which the controls are not repeated.

The operation of the upper portion of Fig. 6 is exactly the same as described in connection with Fig. 3. The operation of the lower portion of Fig. 6 is exactly the same as described in connection with Fig. 5. In Fig. 6, however, the lockout and indication circuits are repeated at the same field station where a lockout relay together with PB and PF relays for transmitting indications are provided. Therefore the lockout operation of Fig. 6 will be a combination of Figs. 3 and 5. If a field station located to the right of the Fig. 6 station initiates an indication cycle the closure of conductors 414 and 416 located in the lower right hand portion of Fig. 6 will be effective to pick up relay RM⁴ and this relay by closing its front contact 490 accomplishes the same purpose as the closure of front contact of 290 of Fig. 5 to repeat the lockout operation in towards the control office.

If the field station of Fig. 6 initiates the cycle for the transmission of indications, then the picking up of relay LO⁴ opens its back contact 456 which opens the circuit including front contact 490 of relay RM⁴ so that distant field stations are locked out. This means that, although a distant field station may pick up relay RM⁴ of Fig. 6 at the same time that relay LO⁴ of Fig. 6 is picked up, the distant field station will be ruled out and the Fig. 6 station will take preference by transmitting its indications during this particular cycle. This is because during the lockout period the opening of back contact 491 of relay FP⁴ de-energizes the indication line circuit 414 extending to the distant station so that the distant station lockout relay is dropped out.

The indication line circuit extending to the distant station includes back contact 492 of relay SB⁴. The circuit including back contact 494 of relay SB⁴ and resistance 3R⁴ is interrupted during the lockout period because relay RM⁴ is de-energized (by the opening of back contact 491). The de-energization of indication line conductor 414 at back contact 491 de-energizes relay RM⁴ so that its front contact 495 is open to prevent the energization of conductor 414 by way of back contact 494 of relay SB⁴ and resistance 3R⁴. Relay RM⁴ cannot be energized by way of its lower winding when the station of Fig. 6 initiates a call because this winding is open during the lockout period at back contact 456 of relay LO⁴.

It will be obvious that the picking up of back contact 491 of relay FP⁴ during the lockout period when a distant station is initiating a cycle and the Fig. 6 station is not, does not remove energy from indication line conductor 414 during the lockout period because of the circuit extending through back contact 494 of relay SB⁴, resistance 3R⁴ and front contact 495 of relay RM⁴ to the (+) terminal of battery IB⁴. The reason relay RM⁴ is energized to maintain its front contact 495 closed is because of the circuit extending from conductor 114 of Fig. 6 (which has energy connected thereto from the control office), back contact 456 of relay LO⁴, front contact 490 of relay RM⁴, back contact 493 of relay SB⁴ and lower winding of relay RM⁴ to conductor 16, which is connected to the source of current in the control office.

It will be understood that resistance CR⁴ of Fig. 6 is for the purpose of charging the indication line leading to the more distant stations and this feature is accomplished in the same manner as previously described in connection with Figs. 5 and 2.

*Description of Fig. 1E.*—The operation of this system is similar to that described in connection with Fig. 1C, except that a branch control and indication repeater station (Fig. 7) is inserted between two of the field stations. The operation of a system laid out in accordance with Fig. 1E thus has the control and indication lines leading to one field station or group of field stations repeated as in Figs. 4 and 5, while the control and indication lines extend through the field station of Fig. 7 to a distant field station or field stations without the control and indication lines being repeated.

This is clearly shown in Fig. 7 in which control line conductors 10 and 12 (upper left) connect to corresponding conductors of Fig. 3, with these lines extending to the right of Fig. 7 where they are connected to another Fig. 3 field station without being repeated. The indication line conductors 114 and 16 of Fig. 7 connect to corresponding lines of Fig. 3 and these lines then extend by way of conductors 14 and 16 to another Fig. 3 field station without being repeated. Conductors 510 and 512 of Fig. 7 are repeated and extend to conductors 10 and 12 respectively of a Fig. 3 field station and conductors 514 and 516 extend to conductors 14 and 16 of this Fig. 3 field station. Therefore one branch of the control and indication line circuits (including conductors 10, 12, 14 and 16) is not repeated, while the other branch including conductors 510, 512, 514 and 516 is repeated in a manner already described in connection with Figs. 4 and 5.

It is therefore not believed necessary to repeat the explanation of this operation since, as above mentioned, Fig. 7 is a combination of Figs. 4 and 5 as far as the repeating operation is concerned, but since it is assumed that there is no field station at this location no lockout relay or indication transmitting relays are required. The back contact 590 of relay RM is required because the indication line extending to the branch which is not repeated is opened when relay RM repeats indications from the branch that is repeated. This gives preference to the repeated line including conductors 514 and 516 in the event that stations upon both branches attempt to transmit at the same time, because relay RM can be energized over the repeated branch to disconnect the branch that is not repeated, including conductor 14 leading to the right of Fig. 7.

*Operation of Fig. 1F.*—A system laid out in accordance with Fig. 1F has a control office connected to a field station, with a branch control and indication repeater field station next in the series. This repeater field station has one branch of the control and indication lines leading to a field station without being repeated and another branch of these lines leading to a field station with this other branch of both the control and indication lines being repeated. The first branch is assumed to connect through a Fig. 3 field station to a repeater field station (combination of Figs. 3 and 4), at which the control line is repeated and the indication line is not. From this station the control and indication lines extend to an end field station.

The other branch leads through a field station (Fig. 3) to a repeater station (not a field station), at which the controls and indications are repeated as in Figs. 4 and 5. From this station the control and indication lines extend to an end field station.

The branch control and indication repeater field station in this layout is a combination of Figs. 6 and 7. The circuits of Fig. 7 are used because both control and indication lines are branched, with one group of each being repeated and with the other group of each not repeated. The circuits of Fig. 6 will be provided because the lockout operation (relay LO with suitable exponent) and the indication transmitting operation controlled by the PB and PF relays will be provided. Since the operations of all of the combinations included in Figs. 6 and 7 have been previously described it is believed unnecessary to repeat this description.

Although the principles of the present invention have been shown applied to several different layouts, it is to be understood that the invention may be applied to other combinations without in any way departing from the spirit of the present invention.

Having thus described a communication system having line circuits arranged in various combinations in accordance with the present invention as specific embodiments of the invention, it is desired to be understood that these forms are selected to facilitate in the disclosure of the invention, rather than to limit the number of forms which it may assume and it is to be further understood that various modifications, adaptations and alterations may be applied to the specific forms shown to meet the requirements of practice, without in any manner departing from the spirit or scope of the present invention except as limited by the appended claims.

What I claim is:—

1. In a remote control system, a plurality of locations including a control office and a plurality of stations, a control line circuit connecting said office with said stations and having a plurality of control impulses impressed thereon carrying control messages, a first indication line circuit connecting said office with a first one of said stations, a second indication line circuit connecting a second one of said stations with said first station, said indication line circuits being conductively distinct, receiving means responsive to said impulses for receiving said control messages, code transmitters at each of said stations, means controlled by said code transmitters and said receiving means for transmitting messages over said first and said second indication line circuits, means interposed between said indication line circuits for receiving messages transmitted over said second indication line circuit and retransmitting them to said office over said first indication line circuit, and lockout means effective to prevent the operation of the code transmitters at said second station during the transmission of messages from said first station.

2. In a remote control system, a plurality of locations including a control office and a plurality of stations, a control line circuit connecting said office with said stations, and having a plurality of control impulses impressed thereon carrying control messages, a first indication line circuit connecting said office with a first one of said stations, a second indication line circuit connecting a second one of said stations with said first station, said indication line circuits being conductively distinct, receiving means responsive to said impulses for receiving said control messages, code transmitters at each of said stations, means controlled by said code transmitters and said receiving means for transmitting messages over said first and said second indication line circuits, means interposed between said indication line circuits for receiving messages transmitted over said second indication line circuit and retransmitting them to said office over said first indication line circuit, and lockout means effective to prevent the operation of the code transmitters at said first station during the transmission of messages from said second station.

3. In a remote control system, a first line circuit, a second line circuit, a third line circuit, a repeating station interconnecting said line circuits, a transmitter associated with each line circuit, a repeater relay at said repeater station, means for causing the transmitter associated with said first line circuit to apply a series of coded impulses thereto, means for causing the transmitter associated with said second line circuit to apply a series of coded impulses thereto, means for causing the transmitter associated with said third line circuit to apply a series of coded impulses thereto, means responsive to the coded impulses applied to said third line circuit for operating said repeater relay, means responsive to the coded impulses applied to said second line circuit for operating said repeater relay, means controlled by the operation of said repeater relay for repeating the coded impulses applied to said third line circuit or to said second line circuit into said first line circuit, means including said relay for preventing the application of coded impulses to said second line circuit while repeating coded impulses from said third line circuit into said first line circuit, and means for decoding the series of coded impulses applied to said first line circuit.

4. In a remote control system, a first line circuit, a second line circuit, a repeater station interconnecting said line circuits, a transmitter associated with each line circuit, a transmitter at said repeater station, a repeater relay and a lock-out relay at said repeater station, means for causing the transmitter associated with said first line circuit to apply a series of coded impulses thereto, means for causing the transmitter associated with said second line circuit to apply a series of coded impulses thereto, means for causing the transmitter at the repeater station to apply a series of coded impulses to said first line circuit, means responsive to the coded impulses applied to said second line circuit for operating said repeater relay, means controlled by the operation of said repeater relay for repeating the coded impulses applied to said second line circuit into said first line circuit, and means controlled by said lock-out relay for rendering the transmitter at the repeater station effective to transmit and to prevent the transmitter associated with said second line circuit from transmitting.

5. In a remote control system, a first line circuit, a second line circuit, a repeater station interconnecting said line circuits, a transmitter associated with each line circuit, a transmitter at said repeater station, a repeater relay and a lock-out relay at said repeater station, means for causing the transmitter associated with said first line circuit to apply a series of coded impulses thereto, means for causing the transmitter associated with said second line circuit to apply a series of coded impulses thereto, means for causing the transmitter at the repeater station to apply a series of coded impulses to said first line circuit, means responsive to the coded impulses applied to said second line circuit for operating said repeater relay, means controlled by the operation of said repeater relay for repeating the coded impulses applied to said second line circuit into said first line circuit, means controlled by said lock-out relay for rendering the transmitter at the repeater station effective to transmit and to prevent the transmitter associated with said second line circuit from transmitting, and lock-out means associated with said first line circuit for preventing the transmitter at the repeater station and the transmitter associated with said second line circuit from transmitting.

6. In a remote control system; a control office and a plurality of stations; a first control line circuit and a first indication line circuit connecting said office with a first plurality of field stations, said first control line circuit having a series of distinctive control impulses selectively impressed thereon in accordance with control messages to be transmitted from said control office; a second control line circuit and a second indication line circuit connecting said first plurality of said stations with a second plurality of said stations; means responsive to said impulses on said first control line circuit for impressing like impulses upon said second control line circuit; step-by-step means at said control office and at each of said plurality of stations all operated in synchronism in response to the impulses on said first and second control line circuits to comprise a cycle of operation; means at each of said stations responsive to said series of control impulses on its said control line circuit for selectively operating movable devices at such station in accordance with the control message transmitted; transmitting means at each of said stations controlled by said step-by-step means at that station for impressing a plurality of indication impulses during said cycle of operation on its said indication line circuit in accordance with indication messages to be transmitted; means responsive to said indication impulses on said second indication line circuit for impressing like impulses on said first indication line circuit during said cycle of operation; lock-out means at each of said stations given a relative superiority to other stations and effective to allow said transmitting means at that station to transmit only when it is the superior station among those stations having indications to transmit at the same time; and means in said control office responsive to said plurality of indication impulses for receiving the messages transmitted over said first indication line circuit; whereby indication messages are transmitted from said second plurality of field stations to said control office during the same cycle of operation used for the transmission of control messages to said field stations.

7. In a remote control system, a control office, first and second field stations, a repeater station intermediate said field stations, a control line circuit extending from said control office through said field stations and said repeater station, a first indication line circuit extending from said control office through said first field station to said repeater station, a second indication line circuit extending from said repeater station to said second field station, impulsing means at said control office for impressing a series of time spaced impulses on said control line circuit to comprise a cycle of operation when initiated, step-by-step means at said control office and at each of said field stations all operated in synchronism in response to said series of impulses on said control line circuit, transmitting means at each field station for selectively opening or closing its respective said indication line circuit on each step of said step-by-step means for transmitting indication messages, means at each field station for conditioning its respective said indication line circuit to initiate a cycle of operation, lockout means at each field station responsive to the conditioning of its said indication line circuit by a preceding field station to prevent such field station from allowing its said transmitting means from selectively opening and closing its said indication line circuit during a cycle of operation, means at said repeater station for repeating an initiating condition from each said indication line circuit into the other, said means also acting to repeat the opened and closed condition of said second indication line circuit for each step into said first indication line circuit during the same step period, and means at said control office responsive to an initiating condition on said first indication line circuit to initiate said line impulsing means, said means also being selectively responsive on each step to the opened or closed condition of said first indication line circuit.

8. In a remote control system; a control line circuit having different series of time spaced impulses applied thereto; two separate indication line circuits, each provided with its own source of current; an impulse repeating relay for repeating each impulse and each time space on said control line circuit; a slow acting cycle marking relay picked up on the first impulse and dropped after the last impulse of each series of impulses on said control line circuit; a double winding message repeating relay; circuit means for connecting a front contact of said message repeating relay in series with one of said indication line circuits when said cycle marking relay is picked up and for connecting both said front contact and one winding of said message repeating relay in series with said one indication line circuit when said cycle marking relay is dropped away; circuit means for connecting the other winding of said message repeating relay in series with said other indication line circuit when said cycle marking relay is picked up and for connecting said other winding in series in said other indication line circuit through a back contact of said impulse repeating relay when said cycle marking relay is dropped away; and circuit means for shunting said other winding including a front contact of said message repeating relay and a back contact of said cycle marking relay.

9. In a remote control system; a control office and a plurality of stations; a control line circuit connecting said office with said stations; impulsing means at the office for impressing series of impulses on said control line circuit when initiated into operation; a first indication line circuit connecting said office with a first one of said stations; a second indication line circuit connecting said first station with a second one of said stations; a separate source of energy for each of said indication line circuits; a code transmitter at each of said stations capable of transmitting a code over the respective indication line circuit passing through that station during a series of impulses on said control line circuit providing such code transmitter is rendered effective; repeating means so connecting said first and second indication line circuits that the open or closed condition of said second indication line circuit is repeated into said first indication line circuit during a series of impulses on said control line circuit, except for the first impulse of such series, and during the absence of a series of impulses, but causing the opened or closed condition of said first indication line circuit to be repeated into said second indication line circuit during the first impulse of such series; means at said control office responsive to the closed condition of said first indication line circuit during the absence of a series of impulses to initiate said impulsing means into operation to impress another series of impulses on said control line circuit; lockout means at each station capable of closing its respective indication line circuit between such station and stations nearer said control office but opening such indication line circuit for more remote stations; and means at each station responsive to the closed condition of its respective indication line circuit during the first impulse of a series, only providing its said lockout means is closing its indication line circuit, to render its code transmitting means effective during the remaining impulses of such series.

10. In a remote control system; a control line circuit having different series of time spaced impulses applied thereto; two separate indication line circuits arranged end to end and each provided with its own source of current; relay means responsive to said time spaced impulses on said control line circuit; and repeater means, in part controlled by said relay means, for repeating the condition of energization of one of said indication line circuits into the other of said indication line circuits during a series of impulses on said control line circuit, except for the first impulse of such series, and during the absence of impulses on said control line circuit, said repeater means acting to repeat the condition of energization of said other indication line circuit into said one indication line circuit during the first impulse of such series.

ROBERT M. PHINNEY.